United States Patent
Pontzer

[11] Patent Number: 6,030,128
[45] Date of Patent: Feb. 29, 2000

[54] INSULATING ARRANGEMENT FOR ELECTRICAL MACHINE SHAFT BEARING

[75] Inventor: Joseph H. Pontzer, Athens, Ga.

[73] Assignee: Reliance Electric Industrial Company, Cleveland, Ohio

[21] Appl. No.: 09/037,493

[22] Filed: Mar. 10, 1998

Related U.S. Application Data

[62] Division of application No. 08/726,017, Oct. 4, 1996, Pat. No. 5,735,615.

[51] Int. Cl.[7] ................................................. F16C 19/50
[52] U.S. Cl. ............................................. 384/476; 384/536
[58] Field of Search ................................. 384/277, 476, 384/536, 582, 624

[56] References Cited

U.S. PATENT DOCUMENTS

| | | | |
|---|---|---|---|
| 2,543,647 | 2/1951 | Stark et al. ............................... | 384/536 |
| 3,672,734 | 6/1972 | Bando ..................................... | 384/536 |
| 4,109,978 | 8/1978 | Ernst et al. . | |
| 4,229,055 | 10/1980 | Olschewski et al. .................... | 384/536 |
| 4,854,751 | 8/1989 | Grassmuck et al. ................. | 384/476 X |
| 4,997,293 | 3/1991 | Ono et al. . | |
| 5,059,041 | 10/1991 | Watanabe et al. ....................... | 384/476 |
| 5,375,933 | 12/1994 | Mizutani et al. ........................ | 384/476 |

*Primary Examiner*—Thomas R. Hannon
*Attorney, Agent, or Firm*—Craig N. Killen; John J. Horn; John M. Miller

[57] ABSTRACT

Bearing assemblies supporting the shaft of an electrical rotating machine are electrically insulated from the bearing housing. For each bearing assembly, a portion of the housing defines a receptacle into which an insertion ring is positioned. The gap between the insertion ring is filled with an appropriate insulative material, such as a nonconductive binding compound or an insulative polymer. In a preferred construction, nonconductive binding compound is located between spacers of insulative polymer. In another preferred construction, a nonconductive coating is applied to the outer surface and the remainder of the gap is filled with nonconductive binding compound. Insulative polymeric material may be used without binding compound in some embodiments. The bearing assembly is maintained in the insertion ring.

2 Claims, 5 Drawing Sheets

6,030,128

INSULATING ARRANGEMENT FOR ELECTRICAL MACHINE SHAFT BEARING

This application is a divisional of application Ser. No. 08/726,017 filed Oct. 4, 1996, now U.S. Pat. No. 5,735,615.

BACKGROUND OF THE INVENTION

The present invention relates generally to the art of electrical rotating machines, such as generators or electric motors. More particularly, the invention relates to an arrangement for electrically insulating the shaft bearing of an electrical rotating machine.

The shaft of an electrical rotating machine is often supported by a bearing assembly maintained in position by the machine housing. In one known construction, the bearing assembly is supported by a portion of the housing known as the "end bell." As its name implies, the end bell is located at one axial end of the housing, and defines a hole through which the rotatable shaft freely extends. The machine may be constructed to either allow or prevent slight axial movement of the bearing assembly, depending upon the exigencies of a particular application.

Operation of the machine will often cause various currents to be induced in the machine housing. If allowed to flow into the bearing assembly, these induced currents may give rise to more frequent maintenance requirements. For example, the currents can arc to the bearing elements in a ball bearing or tapered roller bearing configuration, causing "pits" or other undesirable effects.

Efforts have been made to electrically insulate the bearing assembly from the machine housing. One prior art technique utilizes a ring for maintaining the bearing assembly about the shaft. The ring itself is inserted into a generally complementary receptacle defined in the end bell of the machine housing. A glass tape is provided between the radial outer surface of the ring and the radial inner surface of the receptacle to provide electrical insulation therebetween.

While this technique is effective at providing the desired electrical insulation, it gives rise to certain difficulties in manufacture. For example, a preferred approach is to machine the radial inner surface of the ring to accommodate the bearing assembly after the ring has been inserted into the receptacle of the end bell. To facilitate such machining, it is desirable that the ring remain fixed after insertion into the receptacle. This has been accomplished in the past by providing a very tight press fit between these two components.

To accomplish this press fit, the glass tape is first secured to the radial outer surface of the ring using an appropriate resin. After the resin has set, the glass tape and resin are machined to a diameter slightly larger than the diameter of the receptacle's radial inner surface. The end bell of the housing is then heated to produce a slight expansion. This expansion allows the ring to be slid into the desired position within the receptacle. After the end bell cools, the radial inner surface of the ring can be machined to a size for receipt of the bearing assembly.

SUMMARY OF THE INVENTION

The present invention recognizes and addresses the foregoing disadvantages, and others of prior art constructions and methods. Accordingly, it is an object of the present invention to provide an improved insulating arrangement for a bearing assembly of an electrical rotating machine.

It is another object of the present invention to provide apparatus for supporting a rotatable shaft including that of an electrical rotating machine.

It is also an object of the present invention to provide a method of assembling an end housing portion of an electrical machine housing.

Some of these objects are achieved by an apparatus for supporting a rotatable shaft of an electrical machine. The apparatus comprises a housing portion defining a configured receptacle. The receptacle includes a radial inner surface located about the rotatable shaft. An insertion member is received in the receptacle. The insertion member has a radial outer surface located radially inward from the radial inner surface by a predetermined spacing to define an interposing gap therebetween.

A nonconductive binding compound is located in the interposing gap to fix the insertion member relative to the housing portion. Preferably, the nonconductive binding compound comprises a thermoset binding compound, such as an epoxy.

A bearing assembly defining a shaft bore for receipt of the rotatable shaft therethrough is maintained in position by the insertion member. In exemplary embodiments, the bearing assembly will comprise an inner ring and an outer ring having a plurality of bearing elements therebetween.

In some exemplary embodiments, a plurality of insulative spacer members are located in the interposing gap. In this case, the nonconductive binding compound may be located substantially entirely between the insulative spacer members. Preferably, the insulative spacer members are constructed from a heat resistant polymer.

In other exemplary embodiments, an insulative coating is provided on the radial outer surface of the insertion member. The insulative coating may comprise an insulative paint that has been applied to the radial outer surface of the insertion member.

Other objects of the invention are achieved by an apparatus for supporting a rotatable shaft. The apparatus comprises a support structure defining an annular receptacle, the annular receptacle including a first radial inner surface. An annular insertion member is fixedly maintained in the receptacle. The insertion member has a radial outer surface and a second radial inner surface. The radial outer surface of the annular insertion member is located radially inward of the first radial inner surface of the receptacle by a predetermined spacing to define an interposing gap therebetween. A plurality of insulative spacer members are located in the interposing gap. A nonconductive binding compound is located in the interposing gap between the insulative spacer members. A bearing assembly defining a shaft bore for receipt of the rotatable shaft therethrough is maintained by the insertion member.

In some exemplary embodiments, the support structure may include a closing flange located on a first axial side of the bearing assembly. The closing flange defines a first annular hole through which the rotatable shaft freely extends. The apparatus may also include a cap element connected to the support structure on a second axial side of the bearing assembly. The cap element defines a second annular hole through which the rotatable shaft freely extends.

The annular insertion member may define a flange lip at one axial end thereof. In this case, an insulative material is provided interposing an outer face of the flange lip and an opposed portion of the support structure.

In some exemplary embodiments, the cap element may include an axial extension portion engaging the bearing assembly to prevent relative axial movement thereof. In such embodiments, the apparatus further includes an insulative material interposing the axial extension portion and the bearing assembly.

Other objects of the invention are achieved by an apparatus for supporting a rotatable shaft comprising a support structure defining an annular receptacle. The annular receptacle includes a first radial inner surface. An annular insertion member is fixedly maintained in the receptacle and has a radial outer surface and a second radial inner surface. The radial outer surface is located radially inward from the first radial inner surface by a predetermined spacing to define an interposing gap therebetween. A heat-resistant polymeric sheet material is located in the interposing gap to provide electrical insulation between the support structure and the insertion member. A bearing assembly defining a shaft bore for receipt of the rotatable shaft therethrough is maintained by the insertion member.

Other objects of the invention are achieved by a method of assembling an end housing portion of an electrical machine housing. The method involves providing an end housing portion defining an annular receptacle having a radial inner surface of first predetermined diameter. An annular insertion member is also provided having a radial outer surface of second predetermined diameter sufficiently less than the first predetermined diameter to define an interposing gap therebetween. A viscous binding compound is applied to at least one of the radial inner surface and the radial outer surface. The insertion member is inserted into the receptacle without direct physical contact therebetween. The insertion member is then maintained in this position until the binding compound has been set.

In an exemplary methodology, a plurality of spacer members are located on the radial outer surface of the insertion member. Alternatively, an insulative coating may be applied to the radial outer surface of the insertion member.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
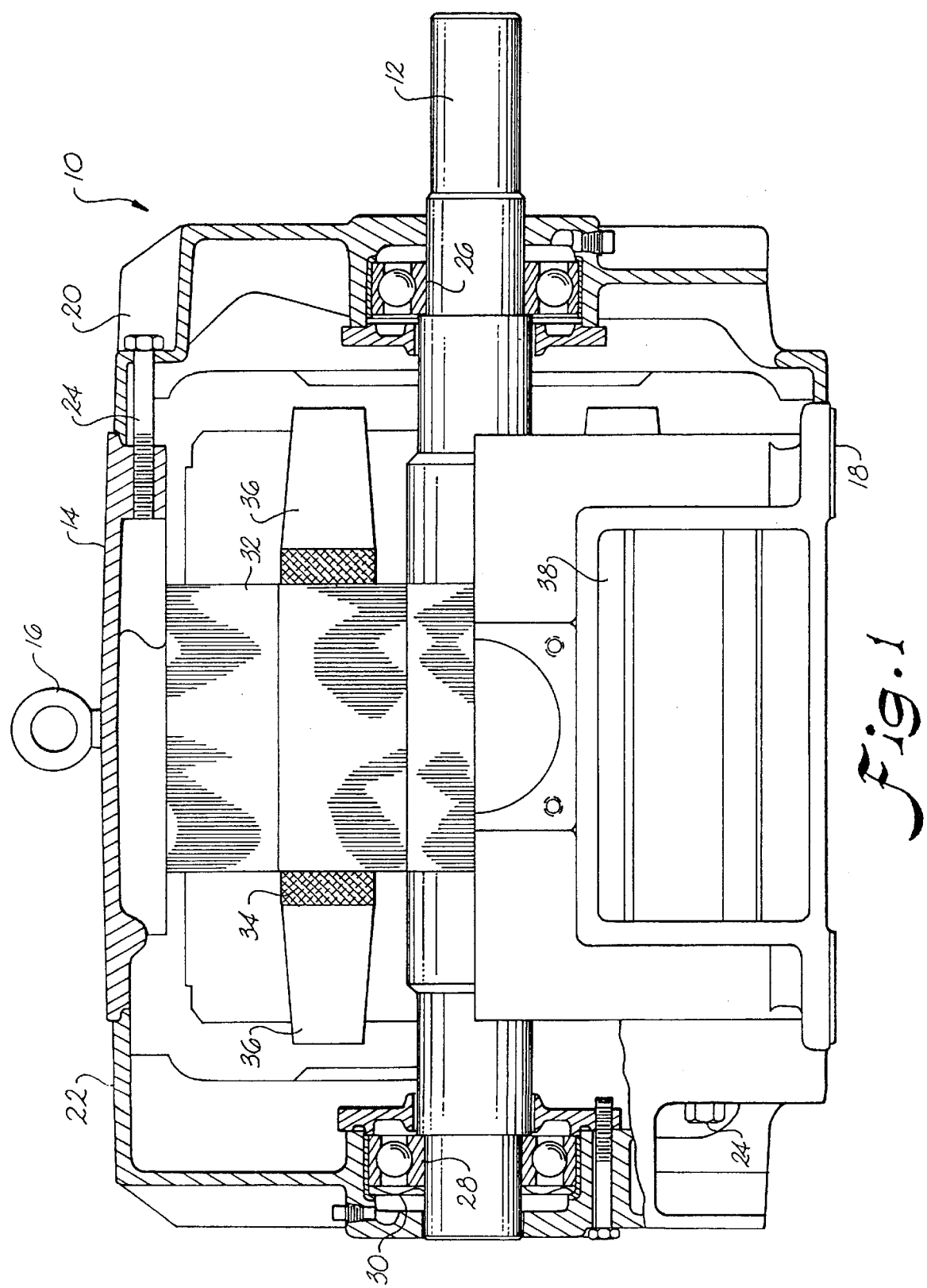
FIG. 1 is an elevational view of an electric motor showing the motor housing partially cut away to reveal various internal components therein.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates a typical electrical rotating machine that may advantageously utilize insulating arrangements of the present invention. In particular, FIG. 1 illustrates an electric motor 10 having a rotatable shaft 12. The internal components of motor 10 are enclosed by a housing including a main housing portion 14. One or more eyebolts 16 may be provided to facilitate lifting of motor 10. Main housing portion 14 defines an appropriate base 18 on which motor 10 will rest during use.

The housing of motor 10 further includes a pair of "end bells" 20 and 22 located at respective axial sides of main housing portion 14. End bells 20 and 22 may be attached to main housing portion 14 by any appropriate means, such as by bolts 24. As shown, end bells 20 and 22 maintain respective bearing assemblies 26 and 28 for facilitating rotation of shaft 12. Shaft 12 continues through bearing assembly 26 and beyond end bell 20 for connection to other equipment. In this case, bearing assembly 28 is located adjacent a terminal end of shaft 12. A thrust washer 30 is located adjacent bearing assembly 28 to urge it in the direction of bearing assembly 26, while allowing for slight axial movement of shaft 12.

Inside of its housing, motor 10 includes a stator winding 32 that remains fixed during operation. On the other hand, a rotor 34 is secured to shaft 12 for rotation therewith. Current in the stator winding and rotor will produce alternately attracting and opposing magnetic fields that cause shaft 12 to desirably rotate. In this case, fins 36 are associated with rotor 34 to circulate cooling air through the housing of motor 10 during rotation of shaft 12. Main housing portion 14 may define vent openings such as that indicated at 38 to facilitate ingress and egress of the cooling air.

As described above, operation of motor 10 may tend to induce currents in the motor housing. If direct electrical connection is permitted between end bells 20 and 22 and the respective bearing assemblies 26 and 28, increased maintenance of motor 10 could be required. Thus, bearing assemblies 26 and 28 are positioned in a manner that eliminates direct electrical connection with the respective of end bells 20 and 22.

Figure 2:
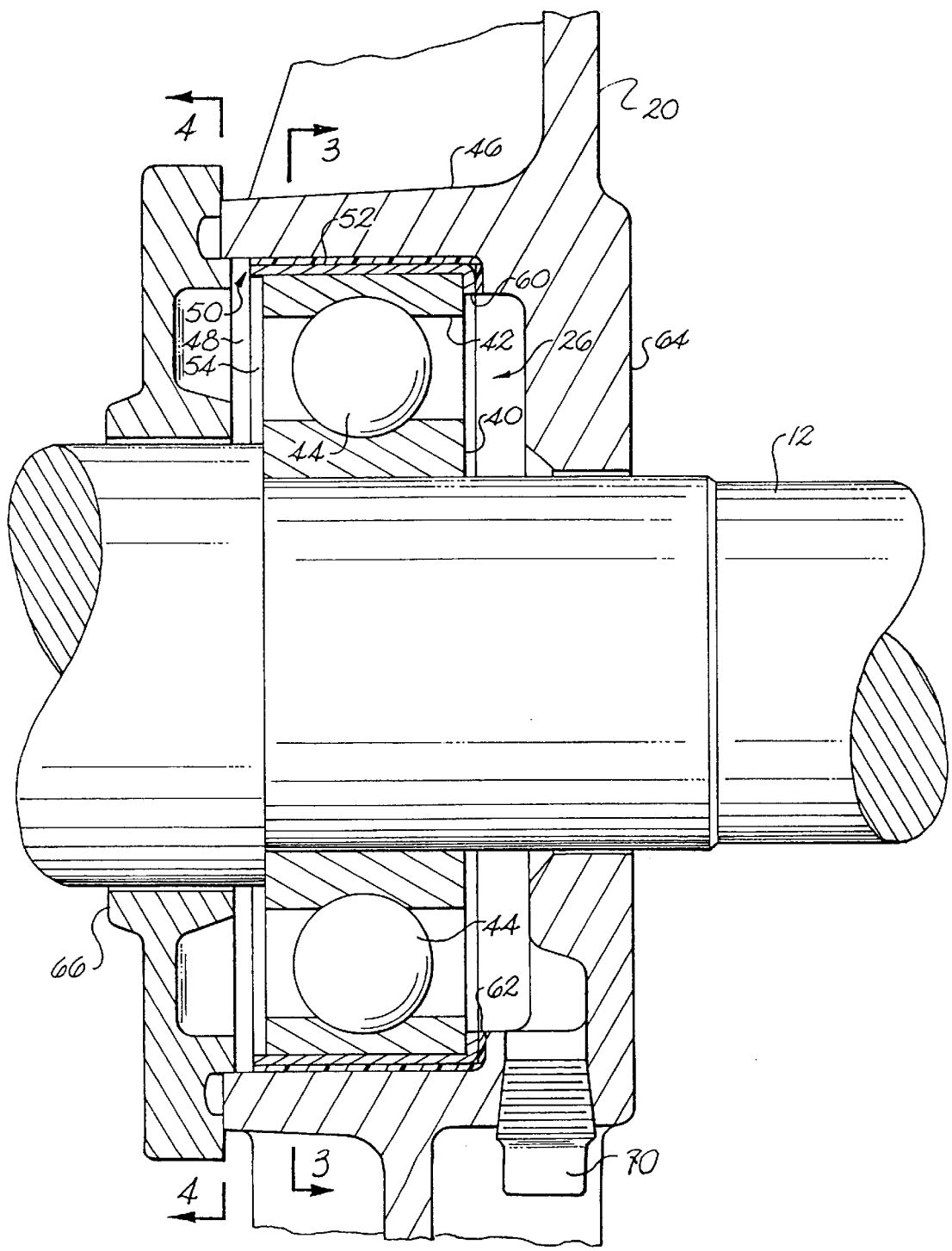
FIG. 2 is an enlarged partial cross-sectional view showing an arrangement of the present invention for electrically insulating a bearing assembly supporting the rotatable shaft.

Referring now to FIG. 2, the mounting arrangement of bearing assembly 26 is shown in greater detail. It can be seen in FIG. 1 that bearing assembly 28 is similarly mounted. In this case, bearing assembly 26 includes an inner ring member 40 in contact with shaft 12 for rotation therewith. Inner ring member 40 defines a raceway on its outer circumferential surface. An outer ring member 42 defines an outer raceway on its inner circumferential surface. The respective raceways of inner ring member 40 and outer ring member 42 are radially opposed to define a space in which a plurality of bearing elements are received. In this case, the bearing elements are constructed as ball bearings 44, although tapered roller bearings or other bearing elements may be used in appropriate situations.

As can be seen, bearing assembly 26 is positioned in a generally annular structure 46 integrally extending from the wall of end bell 20 in an inward axial direction. In particular, structure 46 defines an annular receptacle having a radial inner surface 48 into which bearing assembly 26 is received.

To provide the desired electrical insulation, bearing assembly 26 is maintained in an annular insertion member 50. As shown, insertion member 50 includes a radial outer surface 52 situated in opposition to radial inner surface 48. Insertion member 50 further includes a radial inner surface 54 in contact with the outer circumferential surface of outer ring member 42. As can be seen, the respective diameters of radial inner surface 48 and radial outer surface 52 provide a predetermined spacing therebetween defining an interposing gap. An insulative material is located in this gap to prevent direct electrical connection between end bell 20 and insertion member 50.

Figure 3:
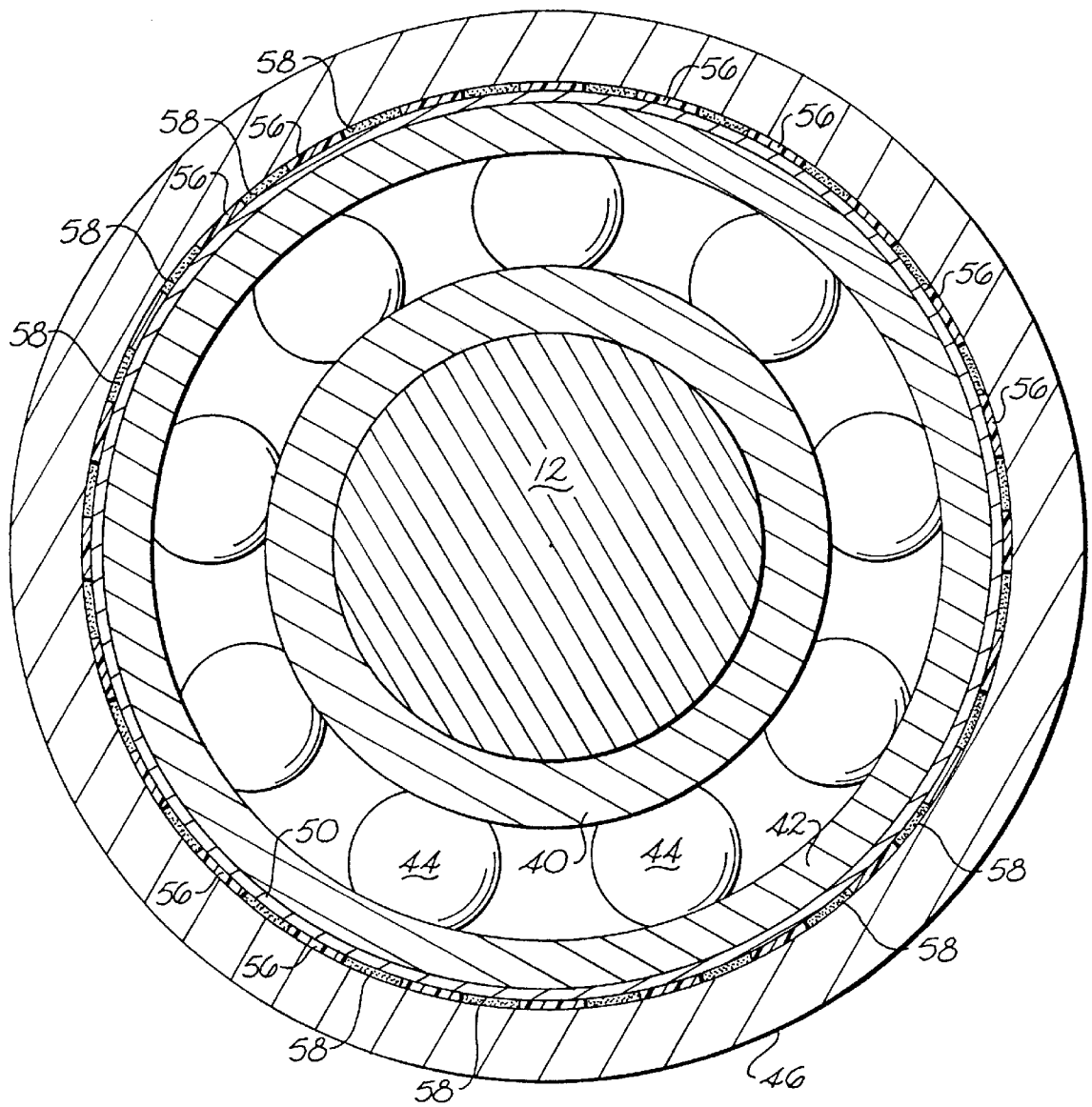
FIG. 3 is a cross-sectional view as taken along line 3—3 of FIG. 2.

In the manufacture of end bell 20, it is desirable that insertion member 50 be fixedly maintained in the receptacle defined by structure 46 before radial inner surface 54 is machined to size. Toward this end, the insulative material provided in the interposing gap is preferably of a type that will prevent relative movement between structure 46 and insertion member 50 despite the machining rigors. Referring now to FIG. 3, a preferred insulation scheme can be clearly seen. In this case, a plurality of spacer members 56 are circumferentially spaced apart in the interposing gap. The region between adjacent spacer members 56 is filled with an appropriate nonconductive binding compound 58.

Preferably, spacer members 56 are made from a suitable heat-resistant polymer. For example, spacer members 56 may be constructed of a Nomex® tape material that can be adhesively applied to outer radial surface 52 prior to assembly. In some exemplary embodiments, this tape may have thickness of approximately ten (10) thousandths of an inch.

The nonconductive binding compound is preferably a thermoset binding compound, such as an appropriate epoxy. A suitable epoxy for this purpose is the known type produced by mixing separate resin and hardener compounds at the time of use.

During assembly, spacer members 56 may be adhesively attached to radial outer surface 52 of insertion member 50. The binding compound is then applied in viscous form to one or both of radial inner surface 48 and radial outer surface 52. Insertion member 50 may then be slid into position in the receptacle defined by structure 46. After the binding compound has set, radial inner surface 54 may be machined to the appropriate diameter for receipt of bearing assembly 26.

It can be seen that spacer members 56 function to maintain the desired spacing between insertion member 50 and structure 46 until binding compound 58 has fully set. Unlike prior art press fit arrangements, this technique permits continuity testing at a time in which the assembly process can be reversed. Specifically, the insulative integrity of the configuration can be tested during the time before binding compound 58 has fully set. If the testing shows a fault in the insulation, insertion member 50 can simply be removed.

Referring again to FIG. 2, it can be seen that insertion member 50 in this case includes a flange lip 60. Flange lip 60 prevents undesirable axial movement of bearing assembly 26 in one axial direction. Depending on the application, some axial movement of bearing assembly 26 may be permitted in the other axial direction.

To prevent direct electrical conduction between flange lip 60 and the opposing face of structure 46, a suitable insulative material 62 is provided therebetween. In this case, insulative material 62 may be constructed as a ring of heat-resistant polymer material, such as Nomex®. In presently preferred embodiments, an adhesive-backed Nomex® tape is utilized for this purpose so that it can be "stuck" to flange lip 60 prior to insertion.

Figure 4:
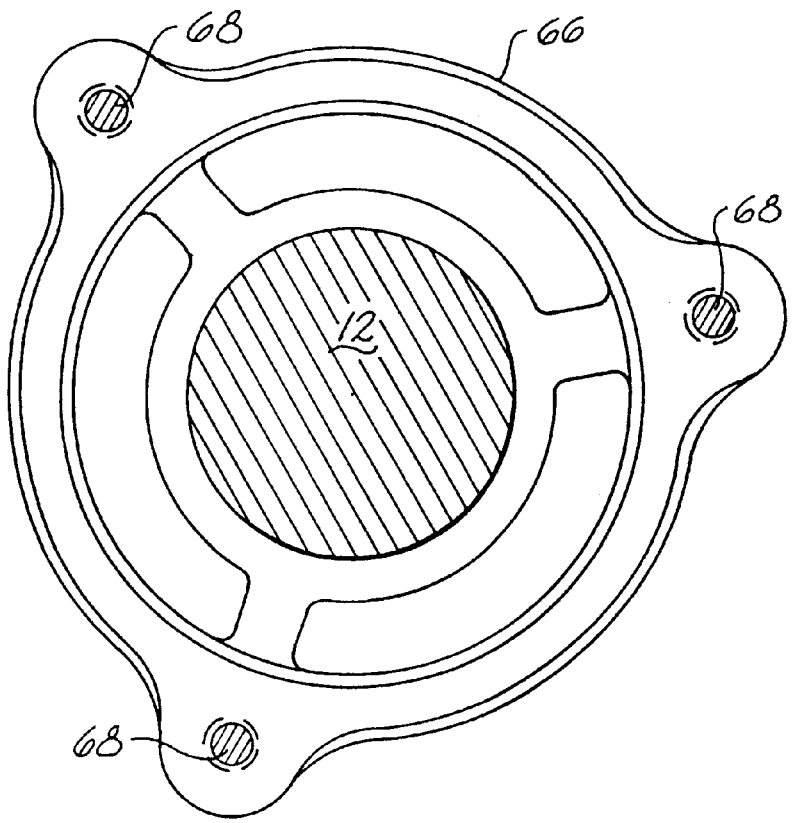
FIG. 4 is a cross-sectional view as taken along line 4—4 of FIG. 2.

Various other aspects of the structure for maintaining bearing assembly 26 will now be described. As can be seen, end bell 20 includes a closing flange 64 defining a hole through which shaft 12 freely extends. In addition, a cap element 66 is connected to support structure 46 on the opposite axial side of bearing assembly 26. Cap element 66 also defines a hole through which shaft 12 freely extends. As shown in FIG. 4, cap element 66 may be maintained by a plurality of threaded members, such as those indicated in cross section at 68.

The axial region bounded by closing flange 64 and cap element 66 defines a reservoir to maintain grease or a similar lubricating compound. A grease drain defined in end bell 20 is normally closed during operation by a threaded plug 70.

Figure 5A:
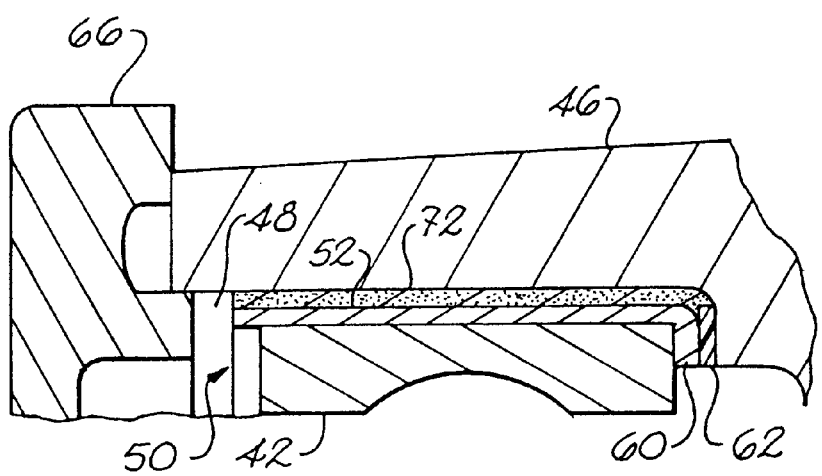
FIG. 5A is an enlarged view of a first alternative insulation arrangement of the present invention.

FIG. 5A illustrates an alternative technique for providing the desired insulation between insertion member 50 and support structure 46. In this embodiment, the gap between radial inner surface 48 and radial outer surface 52 is filled completely with the nonconductive binding compound, as indicated at 72. The region between flange lip 60 and the opposed face of structure 46 is insulated in this case using insulative material 62. It will be appreciated that care must be taken during the period before compound 72 is fully set to maintain the desired gap between structure 46 and insertion member 50.

Figure 5B:
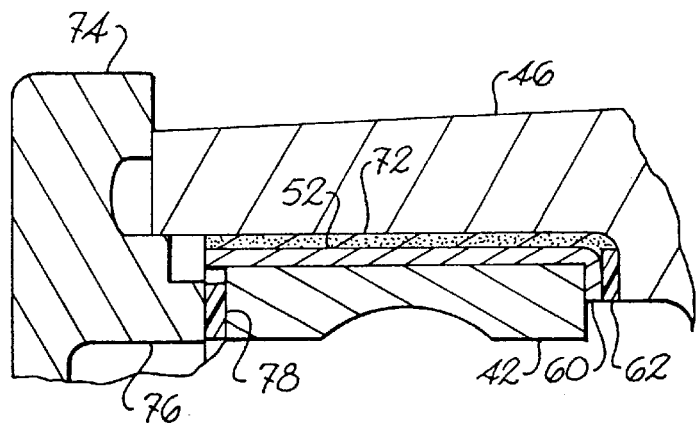
FIG. 5B is an enlarged view of the arrangement shown in FIG. 5A further adapted to prevent relative axial movement of the bearing assembly.

FIG. 5B illustrates an alternative embodiment similar to the embodiment shown in FIG. 5A. In this case, however, axial movement of bearing assembly 26 is prevented by axially locking outer ring member 42 of bearing assembly 26. As noted above, flange lip 60 prevents axial movement of outer ring member 42 in a first axial direction. Axial movement is prevented in the opposite axial direction by a modified cap element 74 including an axial extension portion 76 which typically has an annular configuration. To maintain the desired electrical insulation, extension portion 76 engages outer ring member 42 through an insulative material 78. Preferably, insulative material 78 may be an adhesive-backed ring of insulative material such as that used for insulative material 62.

Figure 5C:
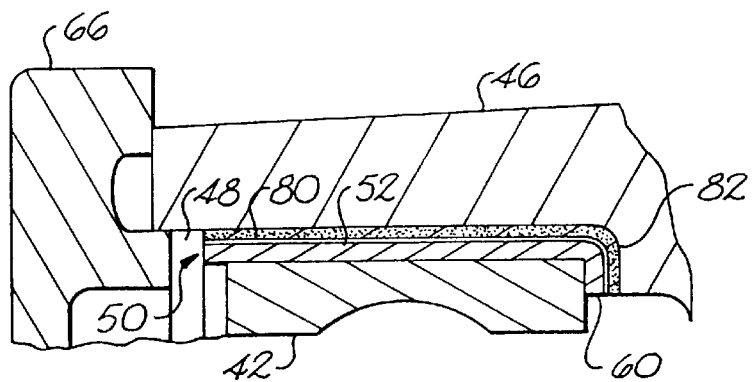
FIG. 5C is an illustration similar to FIG. 5A of a second alternative insulating arrangement of the present invention.

FIG. 5C illustrates a further embodiment of the present invention. In this case, an insulative coating 80 has been applied to radial outer surface 52 of insertion member 50. The remainder of the gap between radial inner surface 48 and radial outer surface 52 is filled by the nonconductive binding compound, as indicated at 82. Coating 80, which may be simply a nonconductive paint, prevents direct contact between insertion member 50 and structure 46 during the period in which the binding compound is allowed to set.

Figure 5D:
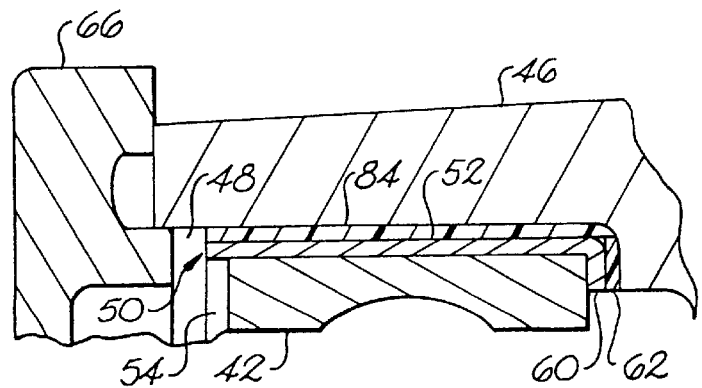
FIG. 5D is a illustration similar to FIG. 5A of a third alternative insulating arrangement of the present invention.

A still further embodiment is illustrated in FIG. 5D. In this case, no binding compound is utilized. Instead, radial outer surface 52 of insertion number 50 is wrapped with an polymeric sheet material 84. Material 84 may be the same material, preferably a heat-resistant polymer, utilized to make insulative material 62.

Due to the absence of the binding material, this embodiment may not allow the radial inner surface 54 of insertion member 50 to be machined prior to assembly. It is nevertheless preferable to provide a press fit arrangement between structure 46 and insertion member 50. As described above with respect to the prior art, this may be accomplished by heating structure 46 until it slightly expands.

Alternatively, insertion member 50 can be "frozen" to produce a slight contraction. After insertion member 50 has been positioned within structure 46, it will gradually warm to room temperature, producing a desired press fit arrangement. In many cases, this "freezing" technique is preferable since it is less likely to disturb the integrity of the insulative material.

It can thus be seen that the present invention provides improved arrangements for insulating a bearing assembly supporting the shaft of an electrical rotating material. While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. Apparatus for supporting a rotatable shaft such the shaft will be electrically isolated, said apparatus comprising:

a support structure defining an annular receptacle, said annular receptacle including a first radial inner surface;

an annular insertion member fixedly maintained in said receptacle, said insertion member having a radial outer surface and a second radial inner surface, said insertion member further defining a flange lip at one axial end thereof;

said radial outer surface located radially inward from said first radial inner surface by a predetermined spacing to define an interposing gap therebetween;

a heat-resistant polymeric sheet material located in said interposing gap to provide electrical isolation between said support structure and said insertion member and further located interposing an outer face of said flange lip and an opposed portion of said support structure; and a bearing assembly maintained by said insertion member, said bearing assembly defining a shaft bore for receipt of said rotatable shaft therethrough.

2. Apparatus as set forth in claim 1, wherein said bearing assembly comprises an inner ring and an outer ring having a plurality of bearing elements therebetween.

* * * * *